US006868765B2

(12) United States Patent
Poetzsch

(10) Patent No.: US 6,868,765 B2
(45) Date of Patent: Mar. 22, 2005

(54) CONTOUR-CUTTING MACHINE HAVING A LIGHT-WEIGHT KNIFE CARRIER

(75) Inventor: Rolf Poetzsch, Freudenberg (DE)

(73) Assignee: Albrecht Baumer GmbH & Co. KG Spezialmaschinenfabrik, Freudenberg (DE)

( * ) Notice: Subject to any disclaimer, the term of this patent is extended or adjusted under 35 U.S.C. 154(b) by 106 days.

(21) Appl. No.: 09/776,482

(22) Filed: Feb. 2, 2001

(65) Prior Publication Data

US 2001/0017072 A1 Aug. 30, 2001

(30) Foreign Application Priority Data

Feb. 5, 2000 (DE) ........................................ 100 05 205

(51) Int. Cl.[7] .......................... B23D 55/08; B26D 1/46; B26D 7/06

(52) U.S. Cl. ............................ 83/174; 83/424; 83/428; 83/433; 83/614; 83/801; 83/814

(58) Field of Search ............................ 83/42, 56, 353, 83/614, 651.1, 661, 788, 794, 801, 910, 174, 424, 428, 433, 814; 125/21

(56) References Cited

U.S. PATENT DOCUMENTS

| | | | | | |
|---|---|---|---|---|---|
| 2,007,219 | A | * | 7/1935 | Singer | 83/801 X |
| 3,254,684 | A | * | 6/1966 | Hawkins | 83/801 X |
| 3,347,121 | A | * | 10/1967 | Wiatt | 83/155 X |
| 3,350,970 | A | * | 11/1967 | Glastra | 83/794 X |
| 4,393,450 | A | * | 7/1983 | Jerard | 700/163 |
| 4,915,000 | A | * | 4/1990 | MacFarlane | 83/651.1 |
| 5,050,472 | A | * | 9/1991 | Potzsch | 83/794 X |
| 6,125,733 | A | * | 10/2000 | Hwang | 83/788 X |
| 6,199,468 | B1 | * | 3/2001 | Hackbarth et al. | 83/788 X |
| 6,386,083 | B1 | * | 5/2002 | Hwang | 83/788 |

FOREIGN PATENT DOCUMENTS

| | | | |
|---|---|---|---|
| EP | 0 390 939 | A1 | 10/1990 |
| EP | 0 390 939 | B1 | 8/1991 |
| EP | 0 738 569 | A1 | 10/1996 |
| EP | 0 738 569 | B1 | 10/1999 |

* cited by examiner

*Primary Examiner*—Clark F. Dexter

(57) ABSTRACT

A contour-cutting machine, in particular for foam. A workpiece table (1) with a table gap (4) and a drive (2) for moving workpieces (3) in the longitudinal direction (X). A movable cutting-element carrier (20) with four pulleys (31 to 34) and an endless cutting element (30) has an open side (20*d*) and an opposite side (20*c*). The cutting-element carrier (20) can be supported and driven in the transverse direction (Y) of the table, on a stationary frame (10), which encloses the workpiece table (1) in the vicinity of the table gap (4), on the open side (20*d*). The cutting-element carrier can also be moved and supported in the longitudinal direction (X) of the table on the opposite side (20*c*).

12 Claims, 4 Drawing Sheets

CONTOUR-CUTTING MACHINE HAVING A LIGHT-WEIGHT KNIFE CARRIER

FIELD OF THE INVENTION

The invention relates to a contour-cutting machine, in particular for foam, comprising a workpiece table with a gap in it, a stationary frame around the table, an endless cutting element through the gap and means for driving the cutting element along the gap.

BACKGROUND OF THE INVENTION

It has been practice to construct contour-cutting machines, with a vertical cutting element in the cutting region, which is guided through a gap in the workpiece table (European patent 0 738 569 A1, inventor: Hueskens). The cutting assembly comprises an open gantry in which there are installed four deflecting pulleys for the cutting element, and the gantry can be displaced in its entirety in order to guide the cutting element along the table gap. In a first embodiment, the main plane of the cutting gantry coincides with the table-gap plane, and such gantry has double the width of the workpiece table making the all-over dimension of the machine very extensive. In the second embodiment, the main plane of the gantry extends perpendicularly to the table gap, and the full width of the contour-cutting machine does only exceed the width of the workpiece table to a small extent, but the gantry has to be designed with high level of rigidity, this resulting in large masses having to be moved.

In order to avoid large masses having to be moved, it is already known from my previous invention (European patent 0 390 939 A1) to provide a stationary cutting-assembly carrier with a top and bottom tool carriage or slide, between which the cutting element is tensioned and which are displaced parallel to the table gap. In the case of a continuous band knife as the cutting element, a storage loop is formed, the latter supplying the missing band-knife length and/or taking up the excess band-knife length. The loop formation of the band knife is not desirable and can be avoided by a contour-cutting machine designed according to a further invention of mine (German publication 195 49 458 A1). However, the stationary frame, which encloses the workpiece table in the vicinity of the table gap, is of double the table width. Four pulleys are used in order to tension and to guide the cutting element in rectangular form. Each of the pulleys in this case is seated on its own carriage or slide and is displaced synchronously on guides parallel to the table gap. Smaller masses are moved as a result. However, the large width of the stationary frame is not desirable.

SUMMARY OF THE INVENTION

It is an object of the present invention to provide a contour-cutting machine which is particularly suitable for foam.

It is another object of the invention to keep the moving masses comparatively small.

It is still another object of the invention to guide the cutting element on a straightforward path.

It is a further object of the invention to keep the machine width practically within the width of the workpiece table.

With invention, use is made of a movable cutting-element carrier which bears the pulleys, and transmits the forces from dead weight, tensioning forces and cutting forces to stationary machine parts over a short distance, with the result that the movable cutting-element carrier can be made up of structural elements which are thin and thus do not have a particularly large mass. A first vertical side of the cutting-element carrier is open and the ends of the cutting-element carrier are supported on the stationary frame which encloses the workpiece table in the vicinity of the table gap, so that the ends of the cutting-element carrier may travel parallel to the table gap. That side of the movable cutting-element carrier which is located opposite the cutting region is similarly guided and supported on a stationary machine part extending along one side of the workpiece table.

The cutting element used may be a so-called polydirectionally cutting wire, or a band knife. If use is made of a band knife, the cutting edge of the latter has to be aligned tangentially to the cutting contour and, for this purpose, use is made of a band-knife-rotating device which is shifted synchronously with the cutting-region or open side of the cutting-element carrier, and is supported on the stationary frame.

It is possible for the cutting-element carrier, in one position, to extend parallel to the workpiece table, and straightforward accessibility to the cutting element is given in this position, with the result that said cutting element can be removed from the pulleys and exchanged. It is also possible for the cutting-element carrier to be moved into a position in which the cutting element has passed through the table gap, in which case the cutting-element carrier then extends transversely or diagonally to the workpiece table. In other words, the ends or corners of the cutting element carrier are shifted along paths which are perpendicular to one another and are formed by guideways extending along one side of the workpiece table and through the table gap.

SHORT DESCRIPTION OF THE DRAWINGS

The invention will be described with reference to the drawings, in which

DESCRIPTION OF THE EMBODIMENTS

Figure 1:
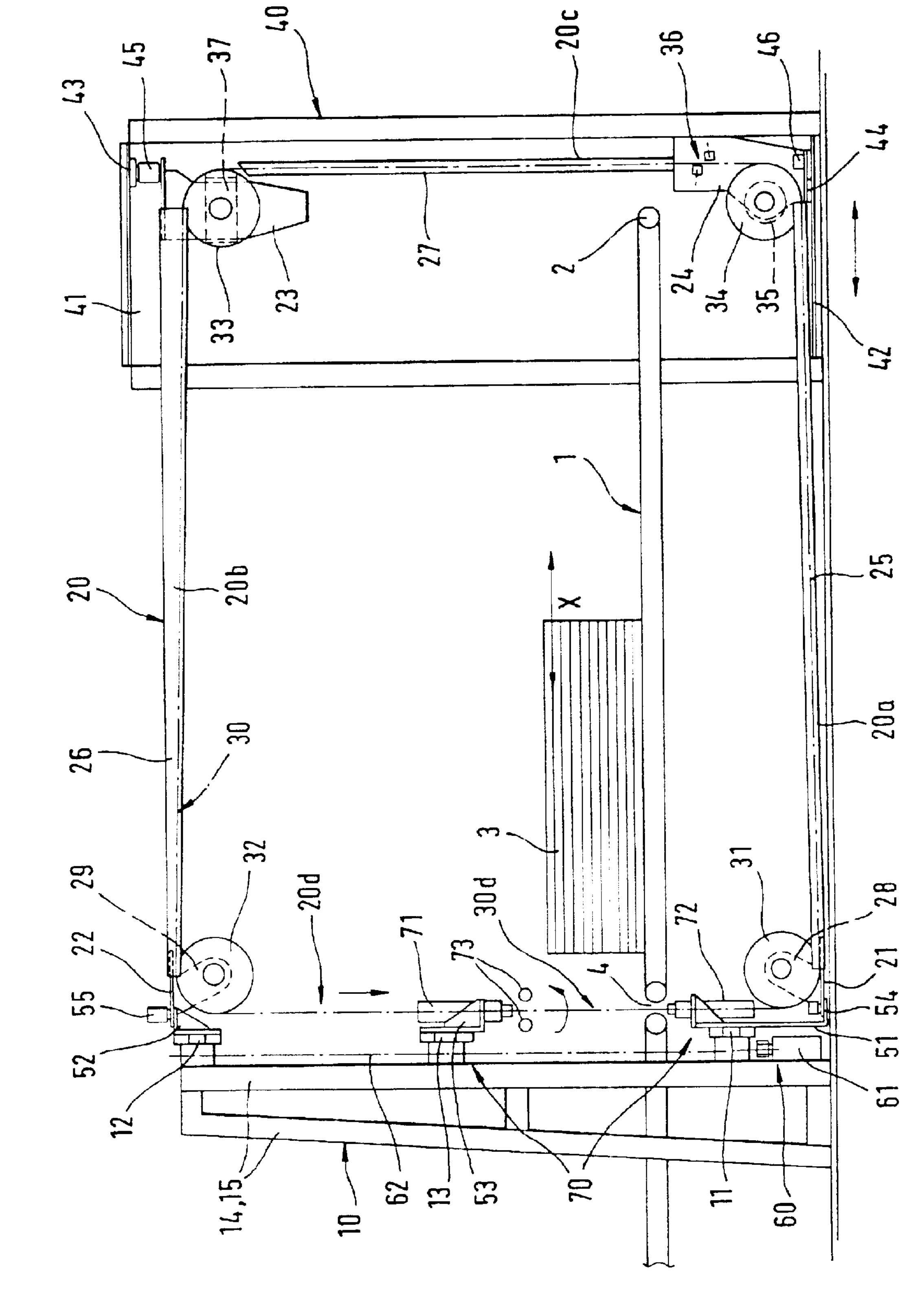
FIG. 1 shows a schematic side view of a contour-cutting machine for foam.

The main parts of the contour-cutting machine are a workpiece table 1 with a drive 2 for movement in the longitudinal direction X, a stationary frame 10, a movable cutting-element carrier 20, an endless cutting element 30, a stationary machine upright 40, a drive device 60 for movement in the transverse direction Y and a knife-rotating device 70.

The workpiece table 1 has a longitudinal drive 2 for moving a workpiece 3 in the X-direction, it being possible for the drive 2 to contain one or more actively driven head rollers which tension and drive a band system as is described in European publication 0 738 569 A1, which is incorporated by reference. It is also possible for the drive for the workpiece 3 to comprise pushing elements, as described in European publication 0 390 939 A1 incorporated by reference. Arranged in the transport path of the workpiece table 1 is a table gap 4, extending transversely to the transport path. The workpiece 3, for example layers of foam, can be moved across the table gap 4 in both x-directions.

The stationary frame 10 encloses the workpiece table 1 in the region of the table gap 4 and has a bottom horizontal guide rail 11, a top horizontal guide rail 12 and a central horizontal guide rail 13 as well as vertical posts 14 and 15. The guide rails 11 and 12 are arranged in a fixed position, while the guide rail 13 can be adjusted vertically along the posts 14 and 15 in order to assume a certain height above the workpiece 3.

The band-knife carrier 20 comprises a bottom half 20*a* and a top half 20*b*, which can be connected to one another via a side 20*c* in order to form a bracket-like structure with an open side 20*d*. The band-knife carrier 20 forms a rectangle, the corners of which each include a corner member 21, 22, 23 or 24. The corner members 21 and 24 are connected to one another via a cross-sectionally U-shaped bar 25 and the corner members 22 and 23 are connected to one another via a further cross-sectionally U-shaped bar 26. A further cross-sectionally U-shaped bar 27 may be provided between the corner members 23 and 24. The profiles of the bars 25, 26, 27 serve for covering the band knife 30. The corner members 21 to 24 each serve for mounting pulleys 31 to 34 via which the band knife 30 is guided and tensioned. The corner members 21 and 22 are of angled design with bearing arms 28 and 29, respectively. Provided on the corner member 24 is a knife-drive motor 35, which drives the pulley 34 and thus the knife 30 in circulation. Said knife runs through the cutting region 30*d* in the vertical direction or Z-direction. Furthermore, a grinding apparatus 36 is located on the corner member 24 and a band-knife-tensioning device 37 is located on the corner member 23.

Located to one of the sides of the workpiece table 1 is a machine upright 40, which has top and bottom longitudinal guides 41, 42 extending in x-direction and supporting each a slide or bearing body 43 and 44. Each body 43 and 44 has a pivot pin or bearing journal 45 and 46, respectively, by means of which the bodies 43, 44 engage in corresponding beddings on the corner members 23 and 24, respectively. It is also possible for the pivot pins or bearing journals 45, 46 to be provided on the corner members 23, 24 if the bearing bodies 43, 44 have corresponding beddings. It is thus possible for the side 20*c* of the band-knife carrier to be moved along the machine upright 40 and for the band-knife carrier 20 to be pivoted at the same time.

Figure 3:
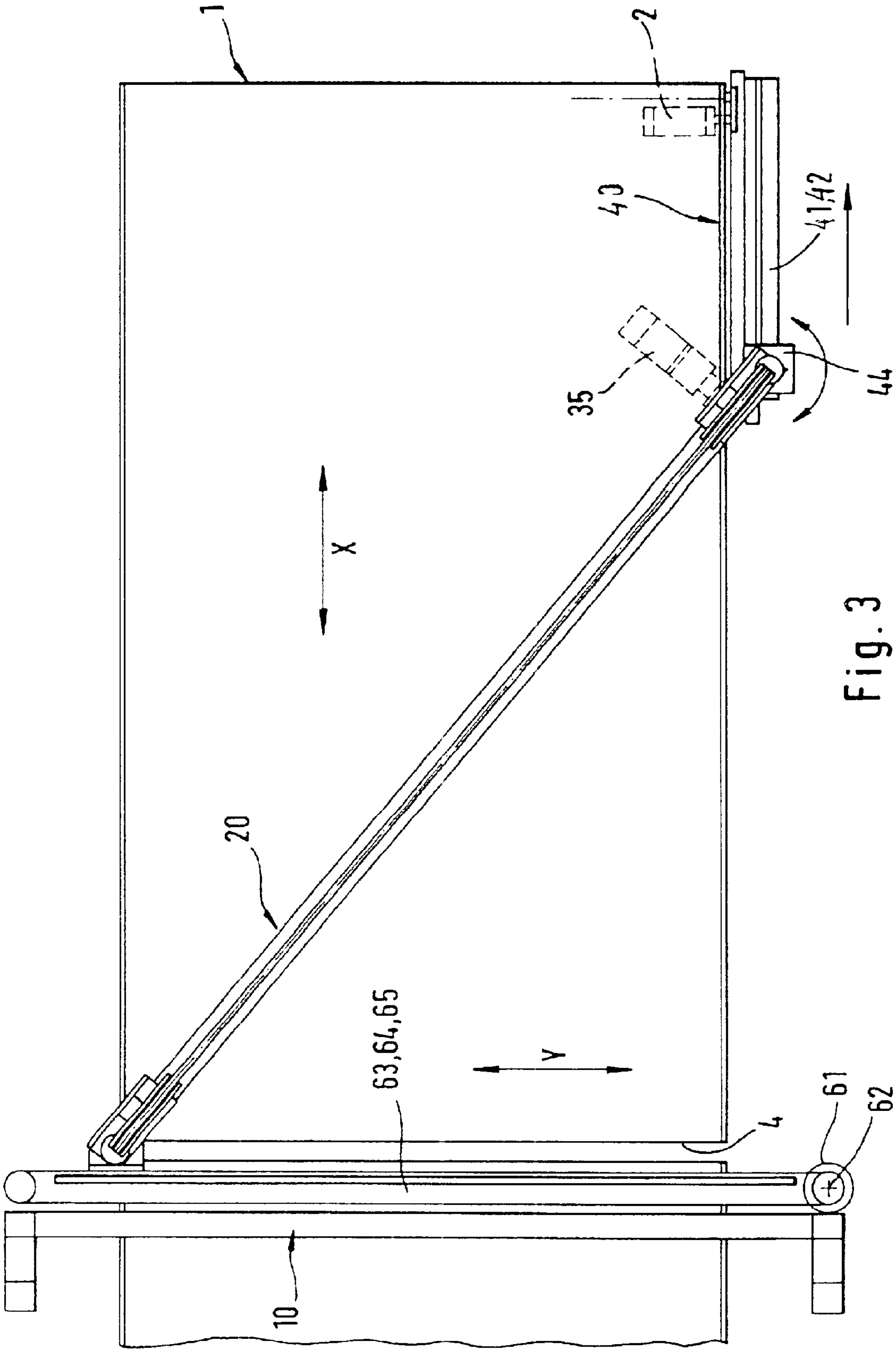
FIG. 3 shows a plan view of the contour-cutting machine in a second position, parts being broken away.
Figure 4:
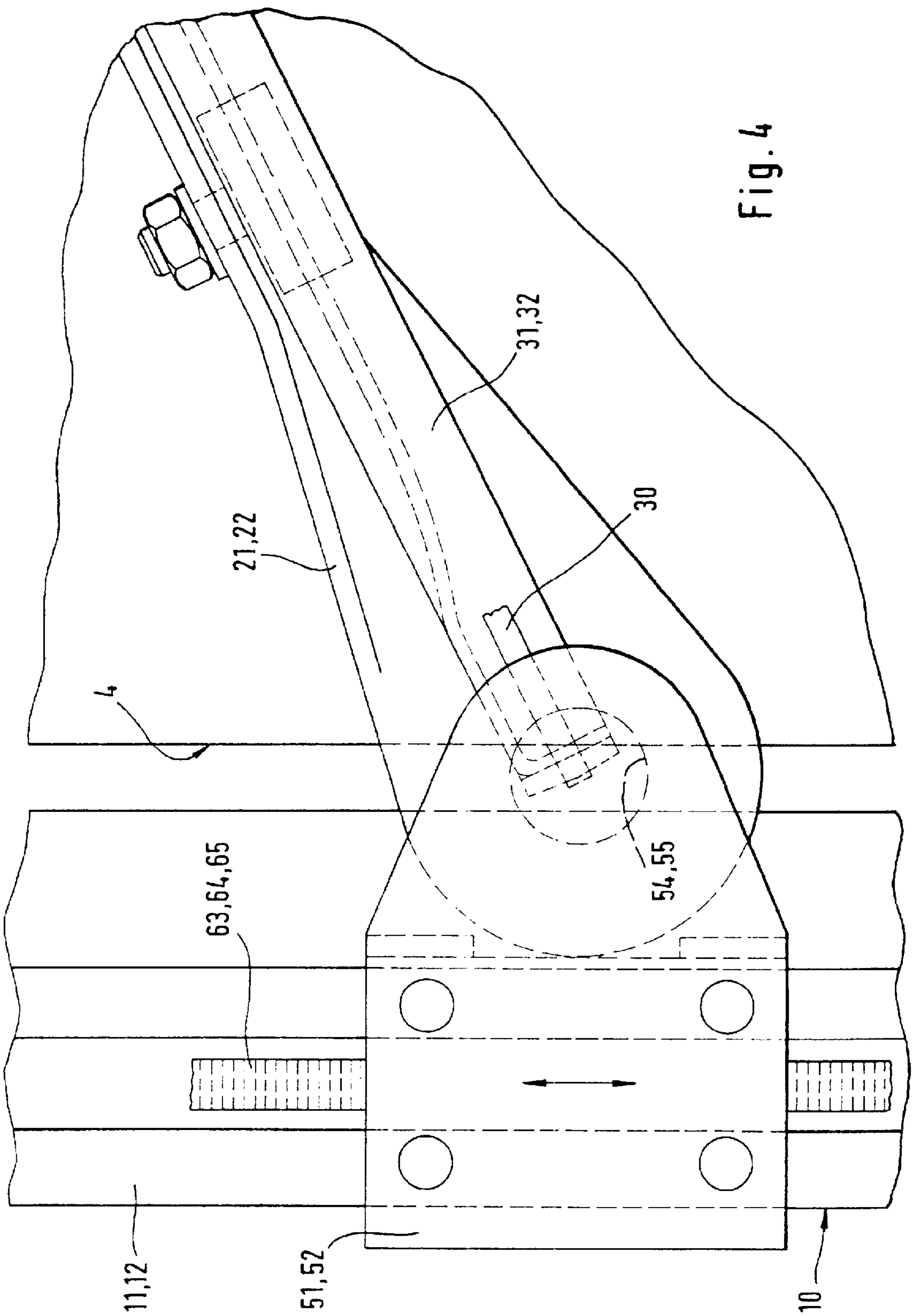
FIG. 4 shows an enlarged detail of the machine.

At its open end 20*d*, the band-knife carrier 20 is similarly guided pivotably along the guide rails 11 and 12 (FIG. 4). Bearing bodies on carriages 51 and 52 are provided for this purpose in order to interact with respect to the journals 54 and 55, which allow the pivoting of the band-knife carrier 20 around an axis through the open side 20*d*. At the same time, the carriages or slides 51, 52 may be shifted along the rails 11 and 12, with the result that the band-knife carrier 20 can be moved out of the position of FIG. 2 into the position of FIG. 3 and back again.

The drive 60 is provided for this purpose, said drive serving for simultaneously driving the carriages or slides 51 and 52 and a further carriage or slide 53. The drive 60 comprises a precisely controllable motor 61, a connecting shaft 62 and three endless toothed belts 63, 64, 65 which are arranged one above the other and run over respective belt pulleys 66, 67. The toothed belts 63 to 65 are connected to the respective slides 51, 52, 53 and carry these along synchronously, with the result that the slides 51, 52, 53 are aligned with one another.

In order for it to be possible to execute shaped cuts, the band knife 30 has to be rotated in the cutting direction in the cutting region 30*d*, and provided for this purpose is a knife-rotating device 70 which has two knife-rotating heads 71 and 72. Said knife-rotating heads 71 and 72 are fastened on the slides 51 and 53 and are thus carried along during the movement of the band-knife carrier 20 and therefore of the band knife 30, with the result that they assume the respectively desired Y-position. In this case, the band knife 30 may be guided through the knife-rotating heads 71, 72 such that the cutting edge of the knife runs precisely through the axis of rotation defined by the pair of knife-rotating heads 71, 72. Such a knife-rotating device is described in European publication 0 738 569 A1, incorporated by reference. The rotary position of the knife-rotating device 70 is regulated by CNC, which also controls the X- and Y-positions of the table and knife. It should be noted that the pivotal position of the band-knife carrier 20 does not influence the X/Y-rotary position of the knife portion which is located in the cutting region 30*d*.

A holding-down means for the workpiece 3, for example in the form of rollers 73, may be provided on the top knife-rotating head 71. Such rollers stabilize the workpiece 3 during the cutting operation.

The contour-cutting machine operates as follows:

The workpiece or workpieces 3 is/are moved into the cutting region 30*d* by way of the workpiece table 1 and the band knife 30 is moved to the desired Y-position within the gap 4, in order for it to be possible to begin the cutting operation at the correct location of the workpiece 3. Furthermore, the band knife 30 is rotated in the cutting direction by the knife-rotating device 70 and is made to circulate by the knife-drive motor 35 being set in motion. As a result of the CNC, the workpiece 3 is then displaced at precise speeds in the X-direction and the band knife 30 is displaced in the Y-direction. At the same time, the quotient of X and Y is formed and fed to the knife-rotating device 70, with the result that the band knife 30 is set to the desired cutting direction in the cutting region. By changing the speeds of X and Y and the directions, it is possible for any desired curves or contours to be followed, as is known.

Figure 2:
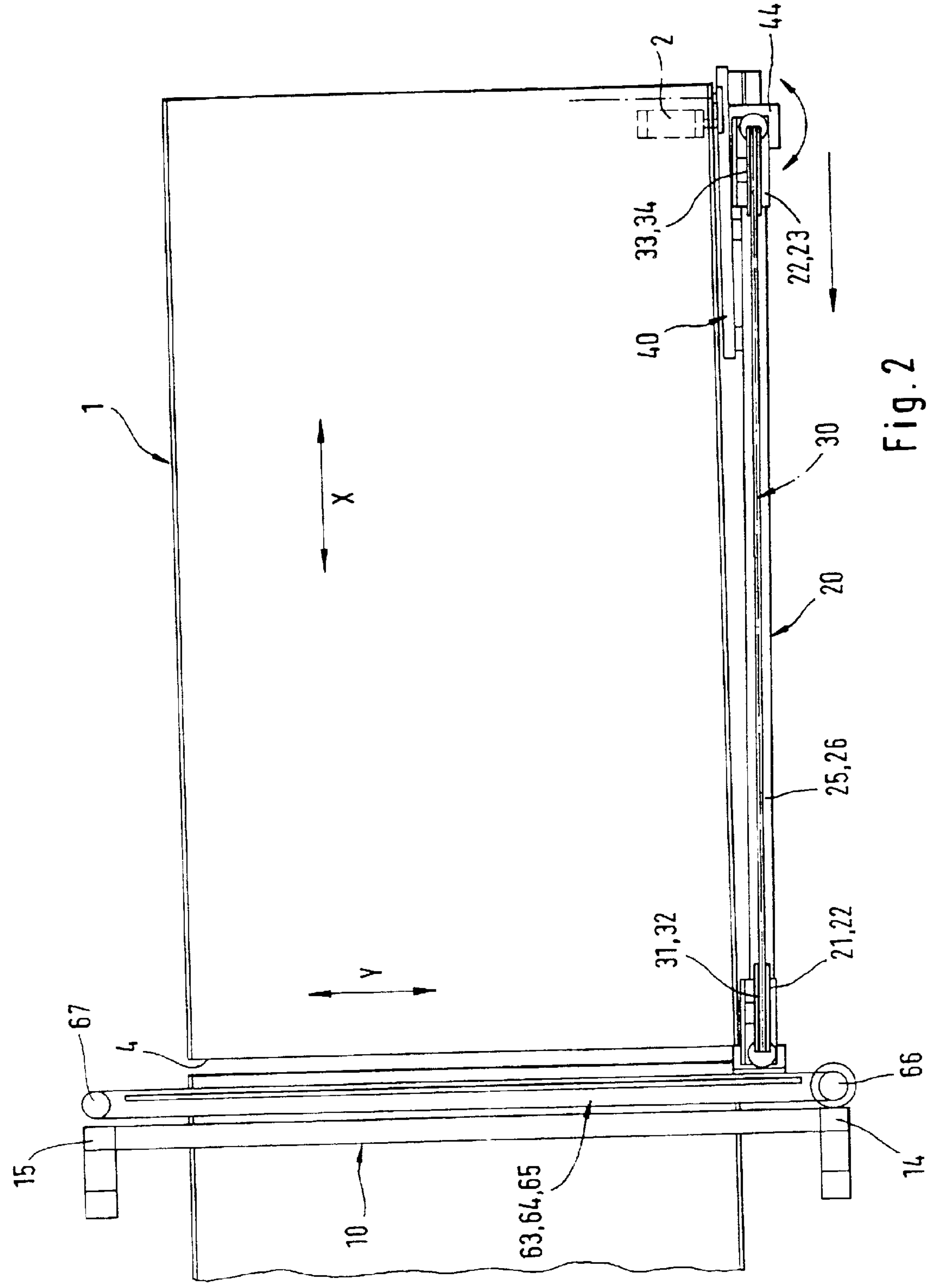
FIG. 2 shows a plan view of the contour-cutting machine in a first position, parts being broken away.

The band-knife carrier 20 is moved along the table gap 4 by its open side 20*d* and, at the same time, is moved along the guides 41 and 42 by its connecting side 20*c*, with the result that the overall movement of the band-knife carrier 20 may be described as an arcuate movement with simultanous pivoting. FIGS. 2 and 3 show the extreme positions of this displacement/pivoting movement. Although, with this movement of the band-knife carrier 20, the plane of the band knife 30 is also changed, it is important that the cutting plane of the band knife 30 is not thereby effected since the cutting plane of the band knife is defined solely by the knife-rotating device 70 in the cutting region 30*d*.

It is also important that forces arising in the band-knife carrier 20 are transmitted to the stationary components 10 and 40 over a short distance, namely from the corner members 21 to 24, via the associated slides or carriages 51, 52 and 43, 44, to the associated rails 11, 12 and 41, 42. This means that there is no need for any heavy frame structure for the band-knife carrier 20.

The above-described embodiment of the contour-cutting machine may be modified. It is thus possible, for example, for the drive movement in the Y-direction to be executed by means of spindles which are driven via electric motors, which are coupled to one another via a so-called electric shaft, in order to drive the slides 51, 52 and 53 synchronously and to the same extent.

It is also possible for the contour-cutting machine to operate using so-called cutting wire, which is an endless cable which is provided with irregularities and cuts equally well in all directions. In such an embodiment, the knife-rotating device 70 and the grinding apparatus 36 are not used.

Instead of the cutting element being driven in circulation by the drive motor 35, it is also possible to provide an oscillating drive as is described, for instance, in European publication 0 390 939 A1, incorporated by reference.

I claim:

1. A contour-cutting machine, which is particularly suited for cutting foam, comprising:

a workpiece table for supporting and moving workpieces in a longitudinal direction, said workpiece table having support means for supporting said workpieces and defining an upper side of said workpiece table, said workpiece table upper side being bounded in said longitudinal direction by a pair of first and second longitudinal extending, lateral sides, a table gap extending transversely to said longitudinal direction between said pair of lateral sides;

said workpiece table including workpiece conveying means for moving said workpieces on said workpiece table upper side in said longitudinal direction across said table gap;

a stationary frame that encloses said workpiece table in a vicinity of said table gap;

a movable cutting-element carrier defining a quad and having an open side and an opposite side, said cutting-element carrier supporting a plurality of pulleys;

an endless cutting element mounted on said pulleys and passing through said table gap at said open side of said cutting-element carrier;

cutting-element driving means for driving said cutting element in a vertical direction along said open side of said cutting-element carrier through a cutting region for said workpieces;

first means for supporting and guiding said cutting-element carrier near said open side thereof in a transverse direction along said table gap;

transverse-direction driving means for driving said cutting-element carrier at said open side thereof in said transverse direction, and second support means for supporting and guiding said cutting element carrier near said opposite side thereof along said first lateral side of said workpiece table in said longitudinal direction.

2. The contour-cutting machine of claim 1 wherein said first supporting and guiding means comprises a pair of first rails extending respectively above and below said table gap and being fixed onto said stationary frame, and a pair of first carriages guided by said pair of first rails and being connected to said cutting element carrier at said open side thereof, said transverse-direction driving means being arranged to drive each of said first carriages with the same speed and to the same extent in said transverse direction of said workpiece-table.

3. The contour-cutting machine of claim 2 wherein said cutting-element carrier comprises a pair of first pivot bearings and a pair of second pivot bearings, a pair of second carriages that are guided by and along said pair of second rails and are connected to said cutting-element carrier at said opposite side thereof for carrying said opposite side of said cutting-element carrier along said first lateral side of the workpiece table, said first bearings pivot being connected to said first carriages and said second bearings to said second carriages.

4. The contour-cutting machine of claim 3 also comprising a top knife-rotating head which is a part of said knife-rotating device, and third means for supporting and guiding said top knife-rotating head in transverse direction (Y), said third supporting and guiding means being arranged between, and extending parallel to said first and second supporting and guiding means and being vertically adjustable in distance to said upper side of said workpiece table.

5. The contour-cutting machine of claim 3 wherein said movable cutting-element carrier has a pair of corner members at said opposite side, the machine also comprising a grinding apparatus for the band knife mounted on one of said corner members, and a tensioning device for the band knife mounted on the other one of said corner members.

6. The contour-cutting machine of claim 1 wherein said second supporting and guiding means comprises an upright having an upper end and a lower end, a pair of second stationary rails being located along said first lateral side of said workpiece table near said upper end and said lower end of said upright, and a pair of second carriages that are guided by and along said pair of second rails and are connected to said cutting-element carrier at said opposite side thereof for carrying said opposite side of said cutting-clement carrier along said first lateral side of the workpiece table.

7. The contour-cutting machine of claim 6 wherein said cutting-element carrier comprises a pair of first pivot bearings and a pair of second pivot bearings, said first bearings being connected to said first carriages and said second bearings to a pair of second carriages that are guided by and along a pair of second rails.

8. The contour-cutting machine of claim 7 also comprising a knife-rotating device, wherein said pair of first pivot bearings and said knife-rotating device define an axis at said open side of said cutting-element carrier, wherein said cutting-element comprises a band knife having a cutting edge, said cutting edge moving through said cutting region for said workpieces when said cutting-element is driven by said cutting-element means, said axis defined by said knife-rotating device extending through said cutting edge.

9. The contour-cutting machine of claim 8 wherein said knife-rotating device comprises an upper member and a lower member where said cutting region is between, said band knife with its cutting edge defining a cutting plane for said workpieces in said cutting region, said upper and lower member of said knife-rotating device being rotatable so as to adjust said cutting plane of said band knife relative to said longitudinal direction (of moving workpieces).

10. The contour-cutting machine of claim 1 wherein said cutting-clement carrier comprises:

four corner members and at least an upper bar and a lower bar, said plurality of pulleys supported by said cutting-element carrier including two upper pulleys and two lower pulley, each corner member mounting and journalling one of said pulleys;

said corner members being arranged according to a rectangle including two upper corner members and two lower corner members, said upper corner members being connected to one another by said upper bar and said lower corner members by said lower bar, each bar defining a predetermined distance between said upper pulleys and between said lower pulleys, respectively.

11. The contour-cutting machine of claim 1 wherein said movable cutting-element carrier has a pair of corner members at said opposite side, the machine also comprising a grinding apparatus for the band knife mounted on one of said corner member, and a tensioning device for the band knife mounted on said other one of said corner members.

12. The contour-cutting machine of claim 1 wherein the cutting element is a band knife, the machine also comprising a knife-rotating device for adjusting said band knife in a desired plane of movement through the table gap, said knife-rotating device being supported by said stationary frame.

* * * * *